(12) United States Patent
Valeri et al.

(10) Patent No.: US 7,109,258 B1
(45) Date of Patent: Sep. 19, 2006

(54) POLYMERIC MATERIAL WITH ANTISTATIC PROPERTIES AND METHOD FOR OBTAINING IT

(75) Inventors: Gualtiero Valeri, Padua (IT); Vito Di Noto, Padua (IT)

(73) Assignees: Renzo Albertini, (IT); Cryvet S.R.L., (IT); Domenico Bombardini, (IT); Armando Artuso, (IT)

( * ) Notice: Subject to any disclaimer, the term of this patent is extended or adjusted under 35 U.S.C. 154(b) by 0 days.

(21) Appl. No.: 09/868,900

(22) PCT Filed: Jan. 5, 2000

(86) PCT No.: PCT/IT00/00005

§ 371 (c)(1),
(2), (4) Date: Jul. 9, 2001

(87) PCT Pub. No.: WO00/40647

PCT Pub. Date: Jul. 13, 2000

(30) Foreign Application Priority Data

Jan. 7, 1999 (IT) ............................... FE99A0001

(51) Int. Cl.
- *C08K 3/14* (2006.01)
- *C08L 33/10* (2006.01)
- *C08L 61/02* (2006.01)
- *C08L 63/00* (2006.01)
- *C08L 67/02* (2006.01)

(52) U.S. Cl. ...................... 523/457; 524/543; 524/555; 524/556; 524/588; 524/590; 524/592; 524/594; 524/597; 524/601; 524/602; 524/609; 524/612; 525/100; 525/107; 525/122; 525/157; 525/165; 525/170; 525/178; 525/183; 525/187; 525/189; 525/222; 525/404; 525/405; 525/406; 525/407; 525/408; 525/409

(58) Field of Classification Search .................... None
See application file for complete search history.

(56) References Cited

U.S. PATENT DOCUMENTS 5,206,297 A * 4/1993 Wernet et al. .............. 525/279

FOREIGN PATENT DOCUMENTS

| EP | 423 602 A1 | 4/1991 |
| EP | 555 197 A2 | 8/1993 |
| EP | 603 147 A1 | 6/1994 |

OTHER PUBLICATIONS

Japanese Abstract JP 04 046960.
Japanese Abstract JP 03 215588.

* cited by examiner

*Primary Examiner*—Robert Sellers
(74) *Attorney, Agent, or Firm*—Hoffman Wasson & Gitler PC

(57) ABSTRACT

A polymeric material with antistatic properties, characterised by comprising a dispersion of ions within a polymeric matrix containing heteroatoms.

39 Claims, 1 Drawing Sheet

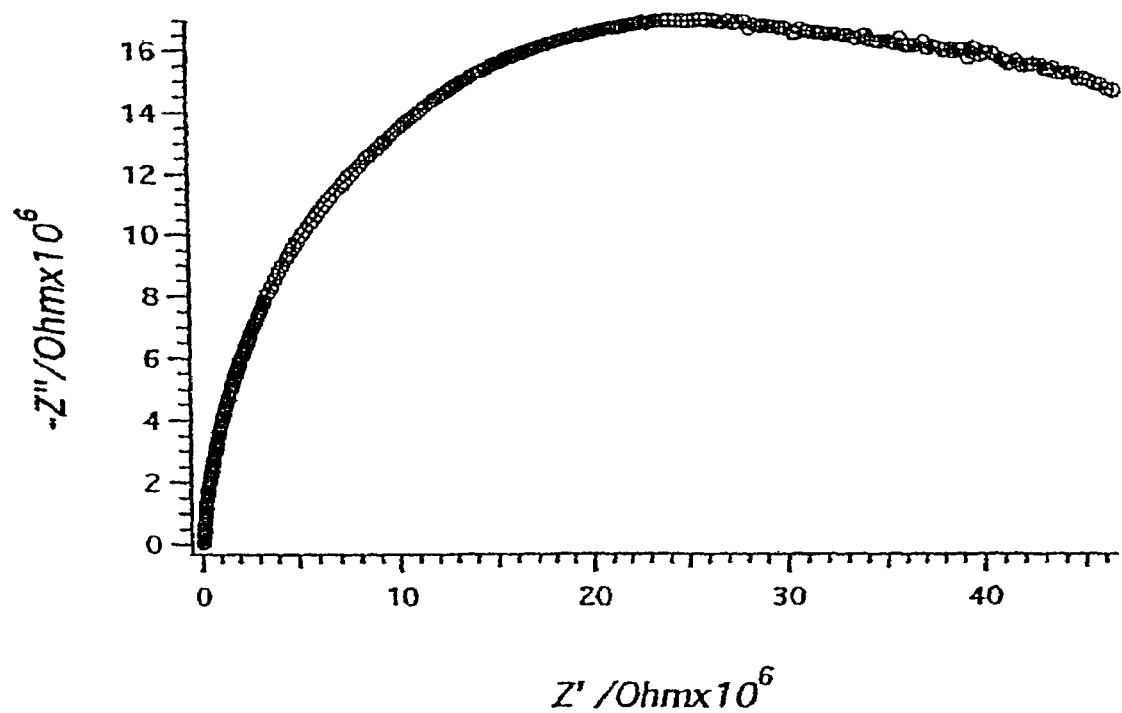

POLYMERIC MATERIAL WITH ANTISTATIC PROPERTIES AND METHOD FOR OBTAINING IT

This invention relates to a polymeric material with antistatic properties and a method for its preparation.

It is well known that surfaces formed from insulating materials can as a result of various phenomena (principally friction) become charged with static electricity. This can cause various problems such as the triggering of electrical discharges, even by walking on a floor, malfunctioning and faults in electronic processors, peripherals or electronic instrumentation, risk of flammable solvent ignition, powder explosion, and a sense of personal discomfort, including a sensation of nausea.

The solution to this problem is to make the surface concerned, or the entire article, slightly conductive by lowering its resistance from the $10^{10}$–$10^{18}$ Ω/cm normally presented by an insulating surface, to $10^8$–$10^{10}$ Ω/cm or sometimes less. This is achievable by:

a) depositing or forming a conductive film on the surface;
b) adding a compound to the material to increase its conductivity.

In this manner the electrostatic charges accumulate with greater difficulty because they dissipate almost instantaneously on formation.

Those chemical compounds possessing this property are known as antistatic agents. The most usual mechanism by which these disperse such charges is to bind the moisture present in the atmosphere, to form a highly conductive layer on the article surface. These compounds are known as surface-active antistatic agents and are able to lower the resistance of a plastic material from $10^{14}$–$10^{16}$ Ω/cm. Another mechanism utilized is to dope the material with a conductive product. Such products are known as conductivity additives and can reduce the electrical resistance of a material to as low as $10^1$–$10^{-2}$ Ω/cm. Antistatic agents are further divided into non-lasting and permanent agents. Non-lasting antistatic agents usually consist of compounds which are variously applied to surfaces to inhibit static energy formation. with use, these degrade spontaneously and their reapplication must be preceded by a suitable process for removing any residues. This is the case with antistatic agents sprayed onto terminals or tables used for maintenance and assembly of electronic circuits, and those used in fabric production and processing.

Permanent antistatic agents are directly incorporated into plastic materials or into synthetic fibres. They are therefore substances compatible with and soluble in the material to be made antistatic. They have to:

a) act for a considerable period;
b) not volatilize and not be removed by wear or the cleaning operations to which the article is subjected. Their life is not indefinite but is however generally comparable to the useful life of the article.

Their life is not indefinite because such substances gradually migrate with time towards the material surface, making it slightly conductive.

Antistatic agents with surface activity are usually incorporated into the material at a concentration of 0.1–2.5% and in some special cases up to 5–7%. They are generally classified as follows:

Cationic antistatic agents: these consist of quaternary ammonium salts, chlorides, nitrates, hydrophosphates, 4-toluene-sulphonates or other phosphonium salts. They are not suitable for incorporation into materials which come into contact with food. Their cost is relatively high.

Anionic antistatic agents: these consist of sodium alkylsulphonates, alkylphosphonates or alkylthiocarbamates. They are generally used in PVC. mixtures.

Non-ionic antistatic agents: these consist of ethoxylates and propyloxylates of long chain alcohols, long chain amines, fatty acid amides, polyethyleneglycol esters with fatty acids or alkylphenols, glycerin mono and diesters with fatty acids, or sorbitol esters. They are the most widespread and versatile antistatic agents. They are generally liquid or have a waxy consistency.

Organometallic antistatic agents: these consist of alkyltitanates or alkylzirconates. They are thermally very stable and migrate fairly slowly within the polymer. Their action is little influenced by moisture.

Conductive antistatic agents are usually incorporated into the material at a concentration of 5–10%, but which in some cases can reach 20%. Antistatic agents of this type include carbon black, metal powders or fibres (of copper or aluminium), carbon fibres or metallized glass, special polymers such as polyacetylene, polypyrrol, polythiophene and polyaniline.

The antistatic effect of a substance is verified by measuring the surface resistance (in accordance with UNI 8298/10 or ASTM D257) or volume resistance (in accordance with UNI 8298/10 or DIN 53482). Their capacity to disperse charges deriving from friction is determined by measuring the half life of the charge in seconds, ie the time within which the accumulated charge is halved (in accordance with DIN 53486 E).

The degree of antistatic protection is usually quantified as follows:

| Electrical resistance | Degree of antistatic protection |
| --- | --- |
| >$10^{13}$ Ω/cm | None |
| $10^{12}$–$10^{13}$ Ω/cm | Low |
| $10^{11}$–$10^{12}$ Ω/cm | Modest |
| $10^{10}$–$10^{11}$ Ω/cm | Good |
| <$10^{10}$ Ω/cm | Excellent |

Commercially available antistatic agents are mostly suitable for a wide range of applications, even though they are particularly provided for addition to synthetic fibres or polyolefins (PP, PE, PS). They are not often available as the pure active principle, but are sold incorporated into a polymeric matrix containing 10–50% of active principle.

An object of the invention is to prepare a material having good conductivity which can be used for antistatic surface coatings and be easily applied to any surface, with the facility for preparing it in transparent form rheologically suitable for atoxic use.

This and other objects which will be apparent from the ensuing description are attained according to the invention by a polymeric material with antistatic properties comprising a despersion of ions within a polymeric matrix containing heteroatoms.

The method for preparing the antistatic polymeric material comprises introducing into the polymeric matrix of a resin containing heteroatoms, in the absence of moisture, at least one electrolyte having a very high degree of purity in terms of the presence of polar molecules able to bind to the ionic lattice of said electrolyte.

BRIEF DESCRIPTION OF THE DRAWING.

A preferred and other embodiments of the invention are described in detail hereinafter with reference to the accompanying FIGURE showing the variation in the impedance of a polymeric material of the invention as a function of frequency (the horizontal axis of the diagram represents the real component of the impedance and the vertical axis represents the imaginary component of the impedance; the frequency increases from right to left).

Procedure 1) comprises reacting a suitable polymer with a particular salt of the low lattice energy under conditions of absolute absence of moisture. An alkaline metal salt, an alkaline earth metal salt or a salt of a transition metal of block d and f is preferably used.

Procedure 2) comprises doping a suitable polymer with a particular polyelectrolyte under conditions of absolute absence of moisture, in the presence or absence of solvents depending on the type of polymer.

The polymer used for preparing the polymeric electrolyte according to the invention generally consists of macromolecules containing in their chain heteroatoms such as O, N, P, Si, S, Se, able to coordinate the salt ions.

The anhydrous salts are obtained either by decrepitating the corresponding salt hydrates at high temperature under vacuum (less than about $10^{-3}$ mbar), or by direct synthesis.

The polymeric electrolyte obtained by procedure 1) or by procedure 2) is homogeneous and has good rheological characteristics and excellent ionic conductivity, able to offer an antistatic protection defined as "excellent" on the basis of the aforegiven classification.

The following examples further clarify the invention.

A) Preparation of Salts and Polyelectrolytes (By Direct Synthesis)

EXAMPLE A.1

2 grams of metal lithium are fed under a rigorously inert argon atmosphere into a 250 ml flask. The apparatus, consisting of a flask provided with a reflux condenser, a dropping funnel and connectors for applying vacuum, is placed in a dry box with an argon atmosphere. About 100 ml of n-clorobutane are added to the lithium via the dropping funnel. The mixture obtained is allowed to react for about eight hours under an argon flow at the boiling point f the chlorobutane. On termination of the reaction it is found that a violet floury product has formed. The reaction takes place quantitatively.

On drying the product obtained, by leaving it for about two days under a vacuum of $10^{-3}$ mbar, a perfectly anhydrous solid is obtained.

Analyses show that this compound is perfectly anhydrous lithium chloride with almost zero lattice energy.

EXAMPLE A.2

Operating under the same conditions as Example A.1, one gram of metal magnesium is reacted with 100 ml of n-chlorobutane in a nitrogen atmosphere. After two hours the reaction produces a greyish solid of floury appearance.

The compound obtained is dried under vacuum for six hours, to obtain a white powder. Analyses show this powder to be magnesium chloride in δ (delta) form.

EXAMPLE A.3

0.5 g of metal magnesium in powder form (50 mesh) are placed in the reactor described in Example A.1, and 30 ml of 1-chlorobutane are added. The mixture is then heated under reflux for two hours. It is then allowed to cool to ambient temperature, after which the overlying liquid is removed by decanting. The solid residue is washed four times with n-hexane and then dried under vacuum.

1.8 g of a floury white solid are obtained ($Mg_{found}$ 24.3%; calculated for $MgCl_2$ 25.5%).

EXAMPLE A.4

4.0 g of metal magnesium in powder form (50 mesh) are placed in the described reactor, and 60 ml of 1-chloropropane are added. The mixture is then heated to reflux temperature for $2^h30^m$. A white solid forms and is separated by decanting, washed with n-hexane and dried under vacuum.

Yield: 14.5 g ($Mg_{found}$ 24.1%).

EXAMPLE A.5

3.0 g of metal magnesium in powder form are reacted with 80 ml of 1-chloropentane as indicated in Examples A.1 and A.2.

The mixture is then heated to reflux temperature for three hours.

11 g of product in the form of a floury white solid are obtained ($Mg_{found}$ 23.5%).

EXAMPLE A.6

3.0 g of metal magnesium in powder form are treated with 100 ml of 1-chlorohexane and reacted at reflux temperature for three hours as in the preceding examples.

A floury white solid is obtained.

Yield: 11.5 g ($Mg_{found}$ 24.5%).

EXAMPLE A.7

3.0 g of metal magnesium are treated with 100 ml of 1-chloroheptane at reflux temperature for three hours.

12 g of floury white product are obtained ($Mg_{found}$ 23.5%).

EXAMPLE A.8

3.0 g of metal magnesium are placed in the described reactor and 100 ml of 1-chlorooctane are added. The mixture is heated for four hours.

11.8 g of a white solid product are obtained.

Yield: 11.8 g ($Mg_{found}$ 23.6%)

EXAMPLE A.9

3.0 g of metal magnesium in powder form are treated with 100 ml of 1-chlorooctane, proceeding as in the preceding example. The mixture is heated for four hours. A white solid product is obtained.

Yield: 11.5 g ($Mg_{found}$ 23.8%)

EXAMPLE A.10

100 ml of 1-chlorobutane are added to a mixture consisting of 4.0 g of metal magnesium in powder form (50 mesh) and 1.0 g of metal zinc in powder form (100 mesh).

The mixture obtained in this manner is heated to reflux temperature under strong agitation for eight hours. It is cooled to ambient temperature and the solid which forms is separated by decanting, is repeatedly washed with n-hexane and dried.

17.0 g of a grey-white product are obtained ($Mg_{found}$ 9.7%, $Zn_{found}$ 2.7%).

EXAMPLE A.11

Proceeding as in Example A.11, 150 ml of chlorobutane are added to a mixture composed of 4.0 g of metal magnesium and 1.5 g of metal zinc.

The mixture obtained in this manner is heated to reflux temperature for six hours. The formed product is separated by decanting, washed three times with hexane and dried.

Yield 16.2 g ($Mg_{found}$ 19.7%, $Zn_{found}$ 2.14%).

EXAMPLE A.12

A mixture consisting of 4.0 g of magnesium in powder form and 0.2 g of zinc in powder form is treated with 200 ml of 1-chlorobutane.

The mixture obtained in this manner is heated to reflux temperature for four hours. A grey-white product is obtained.

Yield 15.8 g ($Mg_{found}$ 22.5%, $Zn_{found}$ 0.56%).

EXAMPLE A.13

100 ml of 1-chlorobutane are added to 4.0 g of metal magnesium in powder form (50 mesh) mixed with 1.0 g of metal copper in powder form (40 mesh).

The mixture obtained in this manner is heated to reflux temperature under strong agitation for five hours. The formed solid is separated by decanting, washed repeatedly with n-hexane and dried under vacuum.

16.5 g of a white-yellow solid are obtained ($Mg_{found}$ 21.5%, $Cu_{found}$ 2.9%).

EXAMPLE A.14

A mixture composed of 3.0 g of metal magnesium in powder form and 0.1 g of metal lithium is placed in the described reactor and 60 ml of 1-chlorobutane are added. The mixture is then heated to reflux temperature under strong agitation for six hours.

12 g of a white solid are obtained ($Mg_{found}$ 24.8%).

EXAMPLE A.15

60 ml of 1-chlorobutane are added to 3.0 g of metal magnesium in powder form, intimately mixed with 0.8 g of lithium chloride.

The mixture obtained in this manner is heated to reflux temperature under strong agitation for six hours. The formed solid is separated, washed with hexane and dried, to give 12.2 g of a white solid ($Mg_{found}$ 24.9%).

EXAMPLE A.16

One gram of metal lithium is reacted with twice the molar quantity of polyethyleneglycol. The reaction is conducted under reflux at a temperature of about 60° C. in a rigorously inert argon atmosphere. The reaction continues for about 24 hours, during the course of which the lithium dissolves completely with the development of hydrogen.

In this manner the lithium alcoholate of polyethyleneglycol 400 is obtained.

EXAMPLE A.17

1 g of metal lithium is reacted with 30 ml of absolute ethyl alcohol. Separately, 20 g of tannic acid (pure, from the ester) are dissolved in 100 ml of absolute ethyl alcohol. The two solutions are then mixed together. The operations are conducted in a rigorously inert argon atmosphere.

The alcohol is then distilled off and the residue dried under vacuum for 6 hours, to obtain anhydrous lithium tannate.

The following polyacids:
  polymethacrylates,
  polystyrenesulphonates,
  poly(θ, 1-glutamix) acid,
  poly(sodium trimethylene oxyethylene)
and the following polybases:
  polyallyldimethylammonium chloride,
  cationic chitosans,
  poly-(4-butylpyridinium bromide)-ethylene,
  poly-(2-N-methylpyridinium iodide)-ethylene,
  polyallylammonium phosphate, can be used in the same manner as the polyethyleneglycol of Example A.16 and the tannic acid of Example A.17 to obtain different polyelectrolytes usable in procedure 2) of the aforeshown general scheme.

Alkaline metals, alkaline earth metals and transition metals of block d and f can be used as cations. Usable anions are those generated by halogens and metalloids of the oxygen and nitrogen group.

B) Polymers

All types of polymers can be treated which in their chain have polar functional groups or heteroatoms such as O, N, P, Si, S, Se and are able to coordinate metal ions and anions.

A list is given hereinafter of commercially available natural and artificial polymeric materials which can be treated as described in this invention.

Natural and Semi-Synthetic Materials:
B1 —Plastic materials from casein: galactite, lanital.
B2—Cellulose and derivatives: cellulose esters, rayon, celluloid, nitrocellulose.

Resins Obtained by Polycondensation:
B3—Phenolic resins: novolac resins.
B4—Aminoplasts.
B5—Aniline resins.
B6—Furan resins.
B7—Ketone resins.
B8—Epoxy resins.
B9—Alkyd resins.
B10—Polyester resins.
B11—Polyether resins.
B12—Polyamide resins.
B13—Sulphonamide resins.
B14—Silicones.
B15—Thiochol polythioethers.

Resins Obtained by Polymerization:
B16—Polyvinyl esters: PVB, PVA.
B17—Polyvinyl ethers.
B18—Polyacetals.
B19—Polyvinylpyrrolidone.
B20—Coumarin resins, polyvinylcarbazole.
B21—Polyacrylic resins: polymethyl-methacrylate.

Polyaddition Resins:
B22—Polyurethanes.

C) Preparation of Polymeric Electrolytes

EXAMPLE C.1

Preparation of the Polymeric Electrolyte
Polyethyleneglycol/MClx, where M=Li$^+$, Mg$^{++}$, and
x=1 or 2)

The lithium or magnesium salt is previously dissolved in ethyl acetate. A solution of polyethyleneglycol in the same solvent is prepared separately. the two solutions obtained in this manner are then mixed together. After heating under reflux for about one hour, the solvent is removed by applying vacuum to $10^{-3}$ mbar and heating to a temperature of about 100° C. Residual solvent traces are eliminated by placing the material under high vacuum of $10^{-6}$ mbar for two days.

EXAMPLE C.2

Synthesis of the Polymeric Electrolyte
polyethyleneglycol-dimethylpolysiloxane

A quantity of polyethyleneglycol-dimethylpolysiloxane is dissolved in perfectly anhydrous ethyl alcohol. A solution of lithium or magnesium salts dissolved in the same solvent is prepared separately. The solutions obtained in this manner are then mixed together. The solvent is then removed under a vacuum of $10^{-3}$ mbar at a temperature of about 5–10° C.

EXAMPLE C.3

Preparation of a Single-Component Epoxy
Resin/MClx, where M=Li$^+$, Mg$^{++}$, and x=1 or 2

The commercial single-component epoxy resin is directly doped by incorporating into it the lithium or magnesium salts prepared as described until they have completely dissolved.

EXAMPLE C.4

Polymeric Electrolyte Based on Two-Component
Epoxy Resins

The component B of the epoxy resin is treated with a quantity of salts, prepared in accordance with one of Examples A1–A17, equal to 0.5–20 wt % of said component, depending on the final characteristics required for the polymeric electrolyte. After the salt has completely dissolved in the component B, accomplished in a controlled atmosphere at high temperature, the component B is mixed with the component A, the product obtained being ready for application by habitual processes.

EXAMPLE C.5

Synthesis of Polymeric Electrolytes by Treating the
Polymers Listed Under Point B with the Salts
Listed Under Point A)

Polymeric electrolytes can be obtained from the polymers listed in Examples B.1–B.22 by treating these either with the salts prepared in accordance with Examples A.1–A.15 by using procedure (1) of the aforeindicated general scheme, or with the electrolyte prepared in accordance with Examples A.16 and A.17 by using procedure (2) of the said general scheme.

In the most cases the quantity of dopant to be dissolved in the polymer is 0.5–20 wt % of the polymer. All the polymeric materials prepared in accordance with the invention have the following characteristics:

good electrical conductivity, less than $10^{10}$ Ω/cm, usable directly as a coating substance, easily applied to any surface to be made antistatic, good transparency, enabling it to be coloured if desired, absolute atoxicity, enabling it to be used in contact with food, for example for internally coating silos, etc.

The invention claimed is:

1. A polymeric material with antistatic properties, comprising a dispersion of ions within a polymeric matrix containing heteroatoms.

2. A polymeric material as claimed in claim 1, wherein the ions dispersed within the polymeric matrix originate from the dissociation of at least one salt.

3. A polymeric material as claimed in claim 2, wherein the ions dispersed within the polymeric matrix originate from the dissociation of at least one inorganic salt.

4. A polymeric material as claimed in claim 2, wherein the ions dispersed within the polymeric matrix originate from the dissociation of at least one organic salt.

5. A polymeric material as claimed in claim 2, wherein the ions dispersed within the polymeric matrix originate from the dissociation of at least one polyelectrolyte.

6. A polymeric material as claimed in claim 3, wherein the ions dispersed within the polymeric matrix originate from the dissociation of a halide.

7. A polymeric material as claimed in claim 6, wherein the ions dispersed within the polymeric matrix originate from the dissociation of a chloride.

8. A polymeric material as claimed in claim 7, wherein the ions dispersed within the polymeric matrix originate from the dissociation of a chloride of an alkaline metal, an alkaline earth metal or a transition metal of block d and f.

9. A polymeric material as claimed in claim 3, wherein the ions dispersed within the polymeric matrix originate from the dissociation of lithium chloride.

10. A polymeric material as claimed in claim 3, wherein the ions dispersed within the polymeric matrix originate from the dissociation of sodium chloride.

11. A polymeric material as claimed in claim 3, wherein the ions dispersed within the polymeric matrix originate from the dissociation of potassium chloride.

12. A polymeric material as claimed in claim 5, wherein the ions dispersed within the polymeric matrix originate from the dissociation of lithium tannate.

13. A polymeric material as claimed in claim 5, wherein the ions dispersed within the polymeric matrix originate from the dissociation of a polymethacrylate.

14. A polymeric material as claimed in claim 5, wherein the ions dispersed within the polymeric matrix originate from the dissociation of a polystyrenesulphonate.

15. A polymeric material as claimed in claim 5, wherein the ions dispersed within the polymeric matrix originate from the dissociation of poly(sulphonate trimethylene oxyethylene) acid.

16. A polymeric material as claimed in claim 5, wherein the ions dispersed within the polymeric matrix originate from the dissociation of the lithium alcoholate of polyethyleneglycol 400.

17. A polymeric material as claimed in claim 5, wherein the ions dispersed within the polymeric matrix originate from the dissociation of polyallyldimethylammonium salt.

18. A polymeric material as claimed in claim 5, wherein the ions dispersed within the polymeric matrix originate from the dissociation of a cationic chitosan.

19. A polymeric material as claimed in claim 5, wherein the ions dispersed within the polymeric matrix originate from the dissociation of a poly-(4-butylpyridinium)-ethylene salt.

20. A polymeric material as claimed in claim 5, wherein the ions dispersed within the polymeric matrix originate from the dissociation of a poly-(2-N-methylpyridinium)-ethylene salt.

21. A polymeric material as claimed in claim 5, wherein the ions dispersed within the polymeric matrix originate from the dissociation of a polyallylammonium salt.

22. A polymeric material as claimed in claim 1, wherein the polymeric matrix pertains to at least one polymer having, in its chains, polar functional groups or heteroatoms such as O, N, P, Si, S, Se and able to coordinate metal ions and anions.

23. A polymeric material as claimed in claim 22, wherein the polymeric matrix pertains to a plastic material from casein.

24. A polymeric material as claimed in claim 22, wherein the polymeric matrix pertains to a material based on cellulose or its derivatives.

25. A polymeric material as claimed in claim 22, wherein the polymeric matrix pertains to a resin obtained by polycondensation.

26. A polymeric material as claimed in claim 25, wherein the polymeric pertains to a resin included in the group comprising aminoplasts, aniline resins, furan resins, ketone resins, epoxy resins, alkyd resins, polyester resins, polyether resins, polyamide resins, sulphonamide resins, silicones and polythioethers.

27. A polymeric material as claimed in claim 1, wherein the polymeric matrix pertains to a resin obtained by additional polymerization.

28. A polymeric material as claimed in claim 27, wherein the polymeric matrix pertains to a resin included in the group comprising polyvinyl ethers, polyacetals, polyvinylpyrrolidone, coumarin resins and polyacrylic resins.

29. A polymeric material as claimed in claim 1, wherein the polymeric matrix pertains to a resin obtained by polyaddition.

30. A polymeric material as claimed in claim 29, wherein the polymeric matrix pertains to a polyurethane resin.

31. A method for preparing a polymeric material with antistatic properties claimed in claim 1, wherein introducing into the polymeric matrix of a resin containing heteroatoms, in the absence of moisture, at least one electrolyte having a very high degree of purity in terms of the presence of polar molecules able to bind to the ionic lattice of said electrolyte.

32. A method as claimed in claim 31, wherein reacting the resin containing heteroatoms with a salt having low lattice energy.

33. A method for preparing a polymeric material with antistatic properties as claimed in claim 31, wherein reacting the resin containing heteroatoms with an inorganic salt.

34. A method for preparing a polymeric material with antistatic properties as claimed in claim 31, wherein reacting the resin containing heteroatoms with an organic salt.

35. A method as claimed in claim 31, wherein utilizing the polymeric matrix of a resin obtained by polycondensation.

36. A method as claimed in claim 31, wherein doping the resin containing heteroatoms with a polyelectrolyte.

37. A method as claimed in claim 31, wherein doping the resin containing heteroatoms with a polyelectrolyte in the presence of solvents.

38. A method as claimed in claim 31, wherein utilizing the polymeric matrix of a resin obtained by addition polymerization.

39. A method as claimed in claim 31, wherein utilizing the polymeric matrix of a resin obtained by polyaddition.

\* \* \* \* \*